United States Patent Office 3,270,068
Patented August 30, 1966

3,270,068
DIMERIZATION OF β-HALOSTYRENES
John J. van Venrooy, Media, Pa., assignor to Sun Oil Company, Philadelphia, Pa., a corporation of New Jersey
No Drawing. Filed Nov. 8, 1963, Ser. No. 322,496
7 Claims. (Cl. 260—649)

This invention relates to the dimerization of β-halostyrenes and more particularly to the dimerization of β-chlorostyrene and β-bromostyrene to produce novel compounds having an indane-type structure. The compounds produced according to the invention are useful as plasticizers for polyvinyl chloride and other resins and as intermediates for preparing flame retardants.

According to the invention a halostyrene which can be either β-chlorostyrene or β-bromostyrene is contacted at a temperature in the range of 0–150° C., more preferably 30–100° C., with a catalyst which is a coordination compound of boron trifluoride and phosphoric acid depicted by the formula $BF_3 \cdot H_3PO_4$. The reaction proceeds exothermically and produces a dimer which is a substituted indane. The reaction is illustrated by the following equation wherein β-chlorostyrene is the starting monomer:

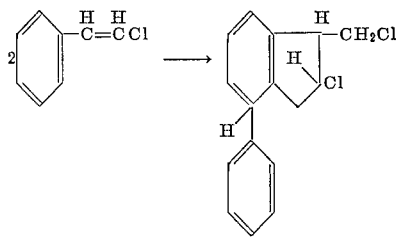

Specifically this novel dimer product is 1-chloromethyl-2-chloro-3-phenyl indane. When β-bromostyrene is used as the monomer, 1-bromomethyl-2-bromo-3-phenyl indane is produced in analogous manner.

The reaction mechanism by which substituted indanes are produced from the β-halostyrenes in the present process appears to involve three steps as illustrated by the following equations.

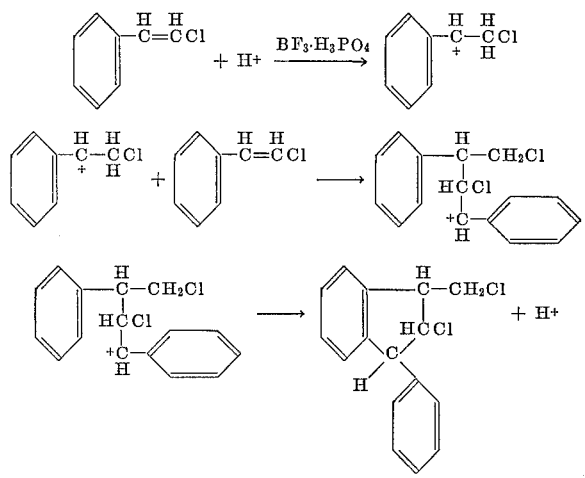

As can be seen from the equations, a carbonium ion forms from the β-chlorostyrene by interaction of the latter with a proton derived from the catalyst and reacts with another molecule of β-chlorostyrene to form a higher molecular weight carbonium ion. Alkylation then occurs between an aromatic ring and the positively charged aliphatic carbon, whereby ring closure takes place to produce an indane structure in which a chloromethyl group is situated at the 1-position, a chloro group at the 2-position and a phenyl group at the 3-position.

The catalyst for the present process can be prepared merely by bubbling $BF_3$ at room temperature into phosphoric acid preferably until an equimolar amount of $BF_3$ has complexed with the phosphoric acid. Preferably 100% $H_3PO_4$ is used although this is not essential. The resulting coordination compound, $BF_3 \cdot H_3PO_4$, is a syrupy clear liquid which has a solidification point of about −105° C. and which tends to fume when exposed to air.

The dimerization reaction can be carried out merely by contacting the $BF_3 \cdot H_3PO_4$ catalyst with the β-halostyrene while vigorously stirring the mixture. The proportion of catalyst to monomer can vary widely but sufficient catalyst should be employed so that good contact between the two phases can be effected. As the reaction proceeds heat is released and the temperature tends to rise. The reaction mixture can be cooled to maintain the temperature at any desired level in the range of 0–150° C. and the temperature preferably is maintained in the range of 30–100° C. When no solvent is used, the reaction mixture becomes progressively more viscous as the reaction occurs, eventually becoming so thick as to be taffy-like. For this reason it is preferable to utilize an inert solvent in carrying out the reaction. Suitable inert solvents include aliphatic and cycloaliphatic hydrocarbons such as n-heptane, isooctane, methylcyclohexane and decalin and saturated chlorohydrocarbons such as chloroform, carbon tetrachloride and ethylene dichloride. Solvents such as aromatic hydrocarbons, ethers and alcohols should be avoided since they tend either to take part in the reaction or to complex with the boron fluoride component of the catalyst.

The major product of the reaction is the dimer formed as illustrated in the equations above. In addition the reaction mixture contains some trimer and a small amount of higher boiling product. In working up the product the reaction mixture is first washed with an aqueous alkali, such as sodium bicarbonate or caustic soda, to remove the catalyst. When no solvent has been used in the dimerization reaction, a solvent should be added to the reaction product to facilitate removal of the catalyst. The washed product solution is then dried by means of a desiccant and the solvent is evaporated. The resulting residue is usually a reddish brown viscous liquid when either the chloro or bromo product is formed. The residue can be distilled under vacuum to separate the dimer from higher boiling products. If desired the trimer can also be obtained as a separate distillate fraction. The dimer fraction as obtained from the distillation generally is a viscous colored oil which tends to crystallize upon standing at room temperature. In the case of the chloro dimer the color is generally pale yellow while the bromo dimer is usually pale red. The dimers can be further purified by crystallization from a suitable solvent such as carbon tetrachloride or diethyl ether, in which event the crystalline chloro dimer appears yellowish white and the bromo dimer pale orange.

The following examples specifically illustrate the invention:

*Example I*

To a 3-neck flask provided with a stirrer and condenser 25 g. of β-chlorostyrene were introduced. The β-chlorostyrene by vapor phase chromatography and infrared analysis consisted of approximately equal parts of the cis and trans isomers. 7 ml. of a $BF_3 \cdot H_3PO_4$ catalyst complex were added during a period of one hour while stirring the mixture. During this time the temperature gradually rose to 65–70° C. at which level it was maintained for 2 hours by first cooling the reaction flask and then heating it as the intensity of reaction diminished. During the reaction period the mixture progressively thickened, eventually becoming taffy-like, and the color changed from reddish brown to a light tan. After the reaction was complete the product was dissolved in 250 ml. of diethyl ether and the solution was washed with a 10% aqueous sodium bicarbonate solution to remove the catalyst. The ether layer was dried over anhydrous $MgSO_4$ and the ether then was evaporated leaving as residue a viscous liquid having a reddish brown color.

This product was distilled under vacuum at a pump pressure of 0.6 mm. Hg absolute and the bulk of the reaction product was collected as a fraction boiling at 154–162° C. at the reduced pressure employed. Another fraction boiling at 162–168° C. was collected in small amount, leaving a still smaller amount of residue. No distillate corresponding to unreacted monomer was obtained. Mass spectrographic analyses of the distillate fractions showed that the 154–162° C. fraction was composed preponderantly of dimer with a small amount of trimer and the 162–168° C. fraction was mainly trimer. Yields by weight were approximately as follows: 89% dimer; 8% trimer; 3% heavy residue. In the mass spectrographic analysis of the dimer fraction the fragmentation pattern revealed a chloromethyl group and a chlorine atom. By nuclear magnetic resonance it was shown that the dimer contained no olefinic double bond and that the ratio of aliphatic to aromatic hydrogen atoms was 5:9, which data are consistent with the structure of 1-chloromethyl-2, chloro-3-phenyl indane. Elemental analysis of the dimer was as follows:

|  | Dimer | Theory |
|---|---|---|
| Percent C | 69.1 | 69.5 |
| Percent H | 5.2 | 5.1 |
| Percent Cl (by diff.) | 25.7 | 25.4 |

Mass spectroscopy showed an average molecular weight of 277.

Example II

β-Bromostyrene was dimerized by substantially the same procedure as described in the preceding example. The reaction mixture was composed of 38.7 g. of the monomer and 10.5 g. of $BF_3 \cdot H_3PO_4$, the reaction temperature was about 70° C. and the reaction time was about 4 hours. Upon working up the product a dimer fraction boiling at 193–195° C. at a pump pressure of 1.8 mm. Hg absolute was obtained in a weight yield of about 65%. As obtained this material was a viscous red liquid which tended to crystallize upon standing. Upon recrystallization from carbon tetrachloride dimer crystals having a melting point of 76–78° C. and a pale orange color were obtained. Analyses by mass spectrograph and nuclear magnetic resonance were consistent with the structure of 1-bromomethyl-2-bromo-3-phenyl indane. The average molecular weight by mass spectroscopy was 366. Elemental analysis of the dimer was as follows:

|  | Dimer | Theory |
|---|---|---|
| Percent C | 50.1 | 52.4 |
| Percent H | 4.1 | 3.8 |
| Percent Br (by diff.) | 45.8 | 43.8 |

The dimers of the present invention can be used as plasticizers for polyvinyl chloride and other resins. They also have utility as intermediates for preparing additives which are suitable in resins not only for plasticizing purposes but also as flame retardants. This can be done by chlorinating the dimers with elemental chlorine to yield more highly halogenated derivatives. Preparation of such derivatives, which are in the form of highly viscous gums, is illustrated in the following examples:

Example III

The dimer of β-chlorostyrene, prepared as described in Example I, was dissolved in carbon tetrachloride and the solution was heated to reflux temperature and contacted for 6 hours with gaseous chlorine. The solvent was then evaporated and a viscous gum of light yellow color was obtained. Analysis showed that the product contained about 40% chlorine by weight. This indicates that the chlorination added about two additional chlorine atoms per molecule to the dimer. The gummy product was useful as a flame retardant for resins.

Example IV

Example III was repeated except that the dimer of β-bromostyrene was substituted for the chloro dimer. Again a light yellow gum was obtained. This product had a total halogen content of about 54%, indicating that about four chlorine atoms per molecule had been added to the bromo dimer. Tests by nuclear magnetic resonance showed that chlorination had taken place at both aromatic and non-aromatic carbon atom positions.

The effectiveness of $BF_3 \cdot H_3PO_4$ as a catalyst for dimerizing β-halostyrenes in the manner herein described has been illustrated by a series of runs in which various other acid-type catalysts were substituted for $BF_3 \cdot H_3PO_4$ and the dimerization of β-chlorostyrene was attempted. The results of these runs are shown in the following tabulation.

| Catalyst: | Result |
|---|---|
| $BF_3$ etherate | No reaction. |
| $ZnCl_2$ | No reaction. |
| $FeCl_3$ | No reaction. |
| $AlCl_3$ | Violent reaction yielding brown solid tar. |
| $H_2SO_4$ (conc.) | Dimerization but with side reactions. |

From the tabulation it can be seen that the only other catalyst tried which produced dimer was concentrated sulfuric acid. However this catalyst causes side reactions to occur and the infrared spectrum of the product exhibits peaks that do not occur when $BF_3 \cdot H_3PO_4$ is used as the catalyst. These additional peaks are believed to be caused at least in part by sulfonation of the aromatic rings by means of the sulfuric acid. Thus no other catalyst was found that was comparable to $BF_3 \cdot H_3PO_4$ for the present purpose.

I claim:

1. Method of preparing a halostyrene dimer which comprises contacting a halostyrene selected from the group consisting of β-chlorostyrene and β-bromostyrene with $BF_3 \cdot H_3PO_4$ catalyst at a temperature in the range of 0–150° C. and thereafter recovering halostyrene dimer from the reaction mixture.

2. Method of preparing a chlorostyrene dimer which comprises contacting β-chlorostyrene with $BF_3 \cdot H_3PO_4$ catalyst at a temperature in the range of 0–150° C. and thereafter recovering chlorostyrene dimer from the reaction mixture.

3. Method of preparing a bromostyrene dimer which comprises contacting β-bromostyrene with $BF_3 \cdot H_3PO_4$ catalyst at a temperature in the range of 0–150° C. and thereafter recovering bromostyrene dimer from the reaction mixture.

4. Method of preparing 1-chloromethyl-2-chloro-3-phenyl indane which comprises contacting β-chlorostyrene with $BF_3 \cdot H_3PO_4$ catalyst at a temperature in the range of 30–100° C. and separating 1-chloromethyl-2-chloro-3-phenyl indane from the reaction mixture.

5. Method of preparing 1-bromomethyl-2-bromo-3-phenyl indane which comprises contacting β-bromostyrene with $BF_3 \cdot H_3PO_4$ catalyst at a temperature in the range of 30–100° C. and separating 1-bromomethyl-2-bromo-3-phenyl indane from the reaction mixture.

6. 1-chloromethyl-2-chloro-3-phenyl indane.
7. 1-bromomethyl-2-bromo-3-phenyl indane.

References Cited by the Examiner
UNITED STATES PATENTS

| | | | |
|---|---|---|---|
| 2,412,595 | 12/1946 | Axe | 252—433 X |
| 2,953,609 | 9/1960 | Wadsworth et al. | 260—649 X |
| 2,976,338 | 3/1961 | Thomas | 252—433 X |

LEON ZITVER, *Primary Examiner.*

K. H. JOHNSON, K. V. ROCKEY, *Assistant Examiners.*